United States Patent
Nakahara et al.

[15] 3,666,708
[45] May 30, 1972

[54] METHOD FOR PREPARING STABLE POLYURETHANE SOLUTIONS

[72] Inventors: Yasuji Nakahara; Jukichi Ohmura; Ryoji Horinaka, all of Fujishi, Japan

[73] Assignee: Asahi Kasei Kogyo Kabushiki Kaisha, Osaka, Japan

[22] Filed: Feb. 13, 1970

[21] Appl. No.: 11,073

[30] Foreign Application Priority Data

Feb. 13, 1969 Japan..................................44/10037

[52] U.S. Cl...............260/32.6 N, 260/30.8 DS, 260/75 NE, 260/77.5 AM, 260/77.5 SP, 260/77.5 SS
[51] Int. Cl...............C08g 22/16, C08g 51/46, C08g 53/00
[58] Field of Search..............260/30.8 DS, 32.6 N, 77.5 SS, 260/77.5 SP, 75 NE, 77.5 AA, 75 NH, 77.5 AM

[56] References Cited

UNITED STATES PATENTS

| | | |
|---|---|---|
| 3,376,264 | 4/1968 | Wieden et al...........................260/75 |
| 3,432,456 | 3/1969 | Oertel et al..........................260/30.2 |
| 3,461,102 | 8/1969 | Oertel et al..............................260/75 |
| 3,475,377 | 10/1969 | Rosendahl et al........................260/75 |
| 2,929,803 | 3/1960 | Frazer et al..........................260/77.5 |
| 3,357,954 | 12/1967 | Kirkaldy..................................260/75 |
| 3,428,611 | 2/1969 | Brotherton et al........................260/75 |
| 3,446,771 | 5/1969 | Matsubayashi et al. ............260/45.85 |
| 3,503,933 | 3/1970 | Kaizerman et al........................260/75 |
| 3,509,102 | 4/1970 | Horn et al............................260/77.5 |

*Primary Examiner*—Donald E. Czaja
*Assistant Examiner*—H. S. Cockeram
*Attorney*—Fred C. Philpitt

[57] ABSTRACT

Method for producing a polyurethane solution which comprises mixing reactants of a prepolymer having terminal isocyanate groups a bifunctional chain-connecting agent having 2 hydrogen atoms capable of reacting with the isocyanate group and 0.5 – 10 mol percent of N,N-dialkylalkylene diamine per mol of the bifunctional chain connecting agent at room temperature and then subjecting the reaction mixture to heat-aging at a temperature of at least 70° C for at least 5 hours.

7 Claims, 1 Drawing Figure

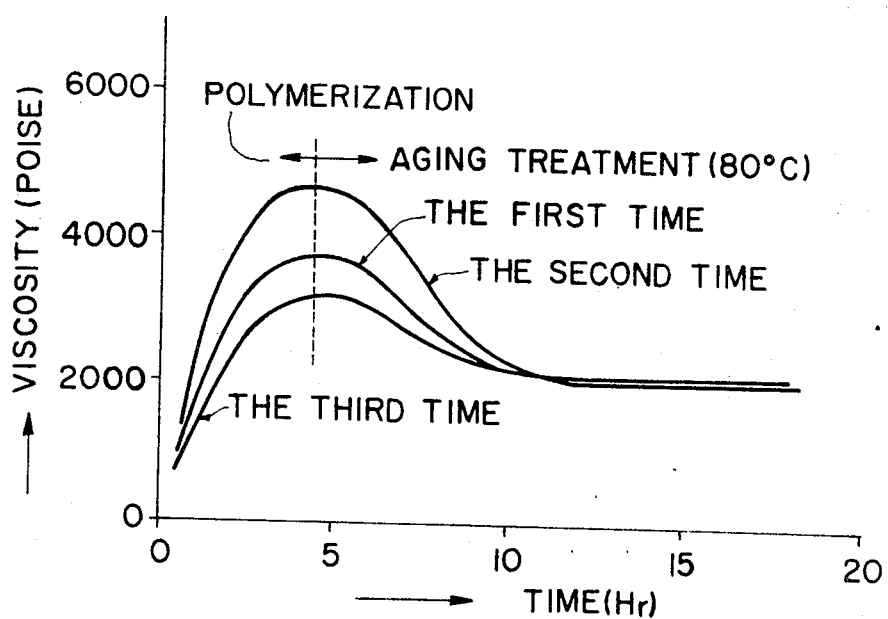

METHOD FOR PREPARING STABLE POLYURETHANE SOLUTIONS

This invention relates to a method for preparing polyurethane solutions. More particularly this invention relates to a method for preparing polyurethane solutions that are exceedingly stabilized and which have good reproducibility.

BACKGROUND OF THE INVENTION

Polyurethane solutions can be obtained by reacting the linear polymer having a terminal hydroxy group with an organic diisocyanate to synthesize a prepolymer having terminal isocyanate groups and reacting this prepolymer with a bifunctional chain-connecting agent having two active hydrogen atoms in its molecule in a solvent such as dimethyl formamide, dimethyl acetamide, dimethyl sulfoxide or the like. Films, fibers or elastomeric shaped articles are produced by extruding these solutions into a coagulation bath or into hot air. However, in the reaction of the prepolymer having terminal isocyanate groups with a bifunctional chain-connecting agent, non-uniform local reactions are liable to occur, and particularly when an aliphatic diamine or hydrazine is used as a chain-connecting agent. The reaction is extremely violent and local, abnormal elevation of viscosity or gelation occurs on account of the three-dimensional cross-linking caused by side-reactions, and the preparation of a polyurethane solution having a constant viscosity and good reproducibility is extremely difficult and the resultant polyurethane solution changes its viscosity with the passage of time by the action of unreacted residual groups remaining in the reaction system, heat, and the like. Such viscosity change often becomes the origin of trouble. These are all well known and experienced by persons skilled in the art.

In order to overcome these drawbacks, several methods have been proposed. For instance, there is a method in which the intrinsic viscosity of a polymer is maintained at a certain constant value and the abnormal elevation of viscosity is prevented by using an aliphatic secondary monoamine such as diethylamine, butylmethylamine, or diisobutylamine as a chain-terminating agent together with a chain-connecting agent in the reaction with a prepolymer having terminal isocyanate groups as disclosed in the official gazette of Japanese Pat. Publication No. 3717/1965. There is also a method in which a prepolymer having terminal isocyanate groups and an equivalent or a slightly less than equivalent amount of an aliphatic amine or hydrazine are reacted in an inert solvent and further an aliphatic monoamine and an organic acid or an amine salt of an organic acid are added to the reaction system as disclosed in the official gazette of Japanese Pat. Publication No. 3472/1966. According to the experience of the present inventors, it is very difficult to sufficiently prevent the change of viscosity caused by heat with the passage of time or to obtain a polyurethane solution with an excellent reproducibility on account of the wide distribution of values of viscosities in each polymerization batch. Moreover, this wide distribution of values of viscosities appears abnormally even when the proportion of reacting groups is strictly controlled. The cause of this phenomenon is not exactly known, but it is believed that this may be due to a certain, abnormal reaction based upon a slight difference in the reaction conditions.

It is an object of the present invention to provide a method for producing polyurethane solutions which do not show the change of viscosity vs. passage of time at all even by the action of heat and which have a constant and always reproducible viscosity.

Such an object can be attained by the method of the present invention.

SUMMARY OF THE INVENTION

According to the present invention, a prepolymer having terminal isocyanate groups is reacted with a bifunctional chain-connecting agent having hydrogen capable of reacting with the isocyanate group and 0.5 – 10 mol per cent of N,N-dialkylalkylene diamine per mol of the bifunctional chain-connecting agent at room temperature and then the reaction mixture is subjected to aging at a temperature of at least 70° C for at least 5 hours.

DETAILED DESCRIPTION

In the method of the present invention, a uniform polyurethane solution can be obtained without abnormal elevation of viscosity and gelation during the chain propagation reaction. Furthermore, the resultant solution shows only a very small viscosity change or rather it is not too much to say that viscosity change hardly occurs. Furthermore viscosities of each polymerization batch show extremely good reproducibility and thus solutions having a constant viscosity can be attained.

The prepolymer having terminal isocyanate groups can be obtained by reacting a linear polymer having a terminal hydroxy radical e.g., polyether, polyester, polylactone or polyetherester with an excess of an organic diisocyanate.

As an organic diisocyanate, even an aliphatic diisocyanate can be used but an aromatic diisocyanate is preferable and in general, methylene-bis(4-phenyl isocyanate) is used.

As a linear polymer, it is suitable to select it from among those having molecular weights of 800 – 3000.

Although the synthesis of a prepolymer can be carried out in an inert organic solvent, it is a common practice to carry out the synthesis at 80° – 95° C in the absence of an inert organic solvent. The thus obtained prepolymer is dissolved in a solvent such as dimethyl formamide, dimethyl acetamide or dimethyl sulfoxide and reacted with a bifunctional chain-connecting agent having a hydrogen capable of reacting with the isocyanate group and N,N-dialkylalkylene diamine.

The amount of N,N-dialkylalkylene diamine used is in the range of 0.5 – 10 mol percent, preferably 1 – 7 mol percent per mol of the bifunctional chain-connecting agent. The greater the amount of N,N-dialkylalkylene diamine, the lower the viscosity of the resultant polyurethane solution and thus it can be suitably selected according to the demand of the application field. It is desirous to carry out the reaction in such a proportion that the sum of the reactive functional groups of the bifunctional chain-connecting agent and N,N-dialkylalkylene diamine is equivalent to or in a slight excess of the equivalent of the isocyanate radical of the prepolymer. It is also desirous to carry out the reaction by adding with vigorous stirring a solution of prepolymer to a solution of a bifunctional chain-connecting agent and N,N-dialkylalkylene diamine in dimethyl formamide.

As the bifunctional chain-connecting agent, a bifunctional compound having two hydrogens capable of reacting with the isocyanate group used as a chain-connecting agent of polyurethane e.g., diamine, glycol, water, hydrazine, dibasic acid can be illustrated.

N,N-dialkylalkylene diamine is an aliphatic primary amine having a tertiary amino radical and includes N,N-dimethylethylenediamine, N,N-dimethyl-1,3-propylenediamine, N,N-diethyl-1,3-propylenediamine, N,N-diethylethylenediamine, N,N-diisobutylethylenediamine, N,N-diisobutyl-1,3-propylenediamine, N,N-n-butylethylenediamine, N,N-n-butyl-1,3-propylenediamine, N,N-allylethylethylenediamine, N,N-diethyl-1,2-propylenediamine, N,N-diethyl-1,4-butylenediamine and N,N-diethyl-1,2-butylenediamine. However, in using these compounds, the compound whose reactivity is very close to that of the isocyanate group of the bifunctional chain-connecting agent simultaneously used should be selected.

As above-mentioned, by reacting a prepolymer, a chain-connecting agent and N,N-dialkylalkylene diamine, a solution of a high viscosity can be obtained. So long as N,N-dialkylalkylene diamine of the present invention is simultaneously used together with a chain-connecting agent at this step, the phenomena of abnormal elevation of viscosity or gelation become unobservable. However, the viscosities of highly viscous solutions at this state in each polymerization batch are only values so widely distributed as in case of the conventional known methods in spite of the strict control of the proportion of each reacting agent and the reaction condition. So far as this point is concerned, there is not much difference from the cases of conventional methods, but a high viscosity solution obtained by the present method causes rapid reduction of viscosity when subjected to aging by heating at a temperature higher than 70° C and reaches a state of constant viscosity. The thus obtained solution is quite stable under the action of heat and so is also when it is left to stand for a long time and does not shown any appreciable viscosity change as measured by a common revolving viscosimeter, namely the viscosity change is practically zero in the solution. Further it is surprising enough that the viscosity of the solution at this state shows extremely good reproducibility in each polymerization batch and even when the viscosities before the heat aging sometimes show a certain extent of variation, they are reduced to a constant value after the heat aging. The cause for this phenomenon is not clear, but such an aging effect appears only when N,N-dialkylalkylene diamine is used simultaneously with a chain-connecting agent.

As for the condition of heat aging, it is desirous to carry out the heat aging at a temperature of at least 70° C, and preferably 80° – 130° C, for at least 5 hours preferably, 8 – 20 hours. It is difficult to reach the end point of viscosity change sufficiently by the use of a temperature lower than 70° C. Although it varies depending upon the temperature of aging, fixation of the viscosity at a constant value is difficult with an aging time shorter than 5 hours.

The inventive concept of the present invention can be understood by referring to the accompanying drawing forming a part of the specification, wherein there are graphs showing the reproducibility of the viscosity of the polyurethane solution prepared in accordance with the present method and viscosities changes and aging effects in each cases of synthesis carried out 3 times are indicated. A prepolymer is synthetized by using a polyesterdiol and methylene-bis(4-phenylisocyanate), and polyurethane solutions containing about 30 percent by weight of polymer were prepared by using N,N-dimethylacetamide as a solvent, hexamethylene diamine as a chain-connecting agent and simultaneously therewith N,N-diethyl-1,3-propylenediamine, 3 times under entirely the same condition. The reproducibility of the solutions were examined and found to be extremely good showing a constant viscosity after aging in spite of the wide distribution of the maximum values just after the polymerization from a low value to a high value. The drawing shows the case of the method of Example 1 which is shown hereinafter.

As above mentioned, since the polyurethane solution obtained in accordance with the method of the present invention does not show any change by the action of heat nor by standing for a long time and has good reproducibility, it is suitable for the production of fibers, films, and elastomeric shaped articles.

It is possible to incorporate in the solution of the present invention pigments such as titanium oxide and the like, various kinds of stabilizers, dyestuffs, etc.

The features of the present invention can more fully be understood by the following non-limiting illustrative examples.

EXAMPLE 1

15 Kg of sufficiently dehydrated polyadipate diol having an average molecular weight of 1,200 and 4.5 kg of methylenebis(4-phenylisocyanate) were heated under a stream of nitrogen with stirring at 50° C for one hour and further at 90° C for 80 minutes. After the resultant prepolymer having terminal isocyanate groups was cooled to 60° C, 28 kg of sufficiently dehydrated and purified dimethyl acetamide was added to the prepolymer and the mixture was stirred at 50° C for 120 minutes to dissolve the prepolymer perfectly and to produce the prepolymer solution. This prepolymer solution was added to a mixture solution of 15 kg of dimethylacetamide, 70 g of N,N-diethyl-1,3-propylenediamine, 300 g of ethylenediamine and 5 g of water with vigorous, high speed stirring and reacted at a room temperature for 4 hours whereby the viscosity of the solution was 4,500 poises (30° C). When aging was continued by heating at 85° C for 20 hours, the resultant polyurethane solution had a viscosity of 2,200 poises (30° C), was colorless and transparent and further showed sufficient spinnability. Even when this solution was heated again at 70° C for 10 hours, there was observed no appreciable change of viscosity and further even when a portion of it was left to stand for one month, there was observed also no appreciable change of viscosity.

EXAMPLE 2

A prepolymer solution obtained similarly to Example 1 was added to a mixture solution of 14 kg of dimethyl acetamide, 50 g of N,N-dimethylethylenediamine and 150 g of anhydrous hydrazine, with vigorous, high speed stirring, and they were reacted at room temperature for 3 hours, whereby the viscosity of the resultant solution was 5,500 poises (30° C). When aging was continued by heating at 85° C for 15 hours, the resultant polyurethane solution had a viscosity of 2,300 poises (30° C), was colorless and transparent and further showed sufficient spinnability property. Even when this solution was heated at 70° C and allowed to stand for 15 hours, there was observed no appreciable change of viscosity, and further even when it was allowed to stand at room temperature for 40 days, there was observed also no appreciable change of viscosity.

EXAMPLE 3

14 kg of polytetramethyleneether glycol having a molecular weight of 1,200 and 4 kg of methylene-bis(4-phenylisocyanate) were reacted at 90° C for 90 minutes under a stream of nitrogen and with stirring. The resultant prepolymer having terminal isocyanate groups was dissolved into 28 kg of sufficiently dehydrated and purified dimethylacetamide with stirring. The resultant prepolymer solution was added with vigorous stirring to a solution of 380 g of 1,3-propylenediamine and 80 g of N,N-diethylethylenediamine dissolved in 15 kg of dimethylacetamide, and reacted at room temperature. The viscosity after 3 hours reaction was 5,800 poises (30° C). When aging was continued by heating at 80° C for 17 hours, the resultant polyurethane solution had a viscosity of 2,500 poises (30° C) and was extremely uniform. Even when the solution was further heated at 80° C. for 10 hours, the viscosity scarcely changed. Further, even when it was allowed to stand at room temperature for several months, there was no appreciable change of viscosity.

We claim:

1. A method for producing a chain-extended polyurethane solution in dimethyl formamide, dimethyl acetamide or dimethyl sulfoxide and having stabilized viscosity which comprises:

a. forming a reaction mixture by admixing at room temperature and in the presence of a solvent selected from the group consisting of dimethyl formamide, dimethyl acetamide and dimethyl sulfoxide:
      1. a prepolymer having terminal isocyanate groups.
      2. a bifunctional chain-connecting agent having 2 hydrogen atoms capable of reacting with the isocyanate group, and
      3. 0.5-10 mol percent of N,N-dialkylalkylene diamine per mol of said bifunctional chain-connecting agent,
   and then,
   b. subjecting said reaction mixture to heat-aging at a temperature between 70°-130° C for at least 5 hours.

2. A method according to claim 1 wherein said prepolymer is obtained by reacting a linear polymer having
   a. terminal hydroxy radicals selected from the group consisting of polyether, polyester, polylactone, and polyetheresterdiols and b. a molecular weight within the range of 800–3000, with an aromatic diisocyanate, said aromatic diisocyanate being in slight stoichiometric excess.

3. A method according to claim 2 wherein said aromatic diisocyanate is methylene-bis (4-phenyl isocyanate).

4. A method according to claim 1 wherein the bifunctional chain-connecting agent is a member selected from the group consisting of diamines, water, and hydrazine.

5. A method of claim 1 wherein N,N-dialkylalkylene diamine is a member selected from the groups consisting of N,N-dimethylethylenediamine, N,N-dimethyl-1,3-propylenediamine, N,N-diethyl-1,3-propylenediamine, N,N-diethylethylenediamine, N,N-diisobutylethylenediamine, N,N-diisobutyl-1,3-propylene-diamine, N,N-n-butylethylenediamine, N,N-n-butyl-1,3-propylene-diamine, N,N-allylethylethylenediamine, N,N-diethyl-1,2-propylenediamine, N,N-diethyl-1,4-butylenediamine, N,N-diethyl-1,2-butylenediamine.

6. A method according to claim 1 wherein the reaction is carried out by adding with vigorous stirring a solution of the prepolymer to a solution of $a$ said bifunctional chain-connecting agent, $b$ said N,N-dialkylalkylene diamine and $c$ dimethyl formamide.

7. A method according to claim 1 wherein the aging is carried on for 8–20 hours.

* * * * *